(12) United States Patent
Olia et al.

(10) Patent No.: US 9,127,574 B2
(45) Date of Patent: Sep. 8, 2015

(54) METHOD FOR OPERATING A POWER PLANT

(75) Inventors: Hamid Olia, Zürich (CH); Jan Schlesier, Wettingen (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 60 days.

(21) Appl. No.: 13/605,273

(22) Filed: Sep. 6, 2012

(65) Prior Publication Data

US 2013/0082467 A1   Apr. 4, 2013

(30) Foreign Application Priority Data

Sep. 7, 2011   (EP) .................................... 11180459

(51) Int. Cl.
| | | |
|---|---|---|
| F02D 25/00 | (2006.01) |
| F01K 23/10 | (2006.01) |
| H02P 9/00 | (2006.01) |
| F01K 13/02 | (2006.01) |
| F02N 11/06 | (2006.01) |
| H02P 9/04 | (2006.01) |

(52) U.S. Cl.
CPC .............. *F01K 23/106* (2013.01); *F01K 13/02* (2013.01); *H02P 9/00* (2013.01); *Y02E 20/16* (2013.01)

(58) Field of Classification Search
USPC ............. 290/4 C, 40 R; 60/39.182, 646, 772
See application file for complete search history.

(56) References Cited

U.S. PATENT DOCUMENTS

| | | | | |
|---|---|---|---|---|
| 3,552,872 A | * | 1/1971 | Giras et al. ....................... 415/17 |
| 3,561,216 A | * | 2/1971 | Moore, Jr. ....................... 415/14 |
| 3,564,273 A | * | 2/1971 | Cockrell ...................... 290/40 R |
| 3,588,265 A | * | 6/1971 | Berry ............................... 415/17 |
| 3,703,807 A | * | 11/1972 | Rice ............................ 60/39.182 |
| 3,757,517 A | * | 9/1973 | Rigollot ..................... 60/39.181 |
| 3,762,162 A | * | 10/1973 | Miura et al. ..................... 60/711 |
| 3,849,662 A | * | 11/1974 | Blaskowski et al. .............. 290/2 |
| 3,959,635 A | * | 5/1976 | Tanco ........................... 700/290 |
| 4,103,178 A | * | 7/1978 | Yannone et al. ............. 290/40 R |
| 4,258,424 A | * | 3/1981 | Giras et al. ..................... 700/290 |
| 4,329,592 A | * | 5/1982 | Wagner et al. .............. 290/40 R |

(Continued)

FOREIGN PATENT DOCUMENTS

| | | |
|---|---|---|
| DE | 3016777 A1 | 5/1981 |
| DE | 102008062588 A1 | 6/2010 |

(Continued)

OTHER PUBLICATIONS

*European Search Report dated May 24, 2012 for European Application No. 11180459.7.

(Continued)

*Primary Examiner* — Pedro J Cuevas
(74) *Attorney, Agent, or Firm* — Buchanan Ingersoll & Rooney PC

(57) ABSTRACT

The method for operating a power plant including a gas turbine and a steam power generation system that activate, or drive, at least one electric generator, wherein the gas turbine produces flue gases that are supplied into a boiler of the steam power generation system. In a steady operation, the gas turbine generates a first output power greater than zero, the steam turbine generates a second output power greater than zero, and a total generated power is a sum of the first and second output powers and is substantially equal to a house load of the power plant.

18 Claims, 4 Drawing Sheets

(56) References Cited

U.S. PATENT DOCUMENTS

| | | | |
|---|---|---|---|
| 4,340,820 A * | 7/1982 | Meyer-Pittroff et al. | 290/40 R |
| 4,362,013 A | 12/1982 | Kuribayashi | 60/772 |
| 4,455,614 A * | 6/1984 | Martz et al. | 700/288 |
| 4,566,267 A * | 1/1986 | Muller et al. | 60/784 |
| 4,631,915 A * | 12/1986 | Frewer et al. | 60/39.12 |
| 4,663,931 A * | 5/1987 | Schiffers et al. | 60/784 |
| 4,665,688 A * | 5/1987 | Schiffers et al. | 60/784 |
| 4,702,081 A * | 10/1987 | Vinko | 60/655 |
| 5,431,016 A * | 7/1995 | Simpkin | 60/650 |
| 5,473,898 A * | 12/1995 | Briesch | 60/646 |
| 5,565,017 A * | 10/1996 | Kang et al. | 95/14 |
| 5,613,356 A * | 3/1997 | Frutschi | 60/783 |
| 5,666,800 A * | 9/1997 | Sorensen et al. | 60/781 |
| 5,865,023 A * | 2/1999 | Sorensen et al. | 60/775 |
| 6,244,033 B1 * | 6/2001 | Wylie | 60/783 |
| 6,588,212 B1 * | 7/2003 | Wallace et al. | 60/772 |
| 6,608,395 B1 * | 8/2003 | Steinway | 290/40 C |
| 6,644,011 B2 * | 11/2003 | Cheng | 60/39.182 |
| 6,751,959 B1 * | 6/2004 | McClanahan et al. | 60/670 |
| 6,766,646 B1 * | 7/2004 | Ford et al. | 60/646 |
| 6,877,322 B2 * | 4/2005 | Fan | 60/781 |
| 6,952,926 B2 | 10/2005 | Blatter et al. | 60/780 |
| 7,188,478 B2 * | 3/2007 | Bourgeois | 60/772 |
| 7,543,438 B2 * | 6/2009 | Wojak | 60/39.182 |
| 8,133,298 B2 * | 3/2012 | Lanyi et al. | 75/460 |
| 8,505,299 B2 * | 8/2013 | Mundra et al. | 60/660 |
| 8,557,173 B2 * | 10/2013 | Lanyi et al. | 266/155 |
| 8,776,521 B2 * | 7/2014 | Tong et al. | 60/653 |
| 8,899,909 B2 * | 12/2014 | Pandey et al. | 415/1 |
| 8,955,302 B2 * | 2/2015 | Van Straaten et al. | 60/39.52 |
| 8,959,884 B2 * | 2/2015 | Hoffmann et al. | 60/39.01 |
| 8,984,894 B2 * | 3/2015 | Droux et al. | 60/795 |
| 9,019,108 B2 * | 4/2015 | Chillar et al. | 340/600 |
| 2002/0189262 A1 * | 12/2002 | Noelscher et al. | 60/772 |
| 2004/0123601 A1 * | 7/2004 | Fan | 60/781 |
| 2006/0053792 A1 * | 3/2006 | Bourgeois | 60/772 |
| 2006/0232071 A1 | 10/2006 | Althaus | 290/40 R |
| 2007/0130952 A1 | 6/2007 | Copen | 60/772 |
| 2009/0019853 A1 * | 1/2009 | Nilsson | 60/715 |
| 2009/0044534 A1 | 2/2009 | Carapellucci et al. | 60/645 |
| 2009/0077944 A1 * | 3/2009 | Wojak | 60/39.182 |
| 2009/0112374 A1 | 4/2009 | Kirchhof et al. | 700/287 |
| 2009/0320493 A1 * | 12/2009 | Olia et al. | 60/773 |
| 2010/0064855 A1 * | 3/2010 | Lanyi et al. | 75/458 |
| 2010/0146982 A1 * | 6/2010 | Lanyi et al. | 60/772 |
| 2011/0016876 A1 | 1/2011 | Cataldi et al. | 60/773 |
| 2011/0289898 A1 * | 12/2011 | Hellat et al. | 60/39.52 |
| 2011/0289899 A1 * | 12/2011 | De La Cruz Garcia et al. | 60/39.182 |
| 2011/0304159 A1 | 12/2011 | Juretzek | 290/40 B |
| 2012/0032378 A1 * | 2/2012 | Lanyi et al. | 266/144 |
| 2013/0145772 A1 * | 6/2013 | Schlesier et al. | 60/775 |
| 2014/0090356 A1 * | 4/2014 | Nakamura et al. | 60/39.182 |
| 2014/0116063 A1 * | 5/2014 | Deng et al. | 60/780 |
| 2014/0130476 A1 * | 5/2014 | Nakamura et al. | 60/39.182 |
| 2014/0150447 A1 * | 6/2014 | Ekanayake et al. | 60/778 |
| 2014/0208765 A1 * | 7/2014 | Ekanayake et al. | 60/774 |
| 2014/0239638 A1 * | 8/2014 | Schlesier et al. | 290/44 |
| 2014/0250901 A1 * | 9/2014 | Olia et al. | 60/773 |
| 2014/0250911 A1 * | 9/2014 | Huntington et al. | 60/780 |
| 2014/0250913 A1 * | 9/2014 | Olia et al. | 60/783 |
| 2014/0290264 A1 * | 10/2014 | Hovel | 60/772 |
| 2015/0000279 A1 * | 1/2015 | Mohr et al. | 60/646 |
| 2015/0007575 A1 * | 1/2015 | Drouvot et al. | 60/772 |
| 2015/0007577 A1 * | 1/2015 | Li et al. | 60/772 |
| 2015/0047366 A1 * | 2/2015 | Carroni et al. | 60/779 |
| 2015/0082803 A1 * | 3/2015 | Droux et al. | 60/783 |
| 2015/0107257 A1 * | 4/2015 | Van Straaten et al. | 60/772 |

FOREIGN PATENT DOCUMENTS

| | | |
|---|---|---|
| EP | 1736638 A1 | 12/2006 |
| EP | 2056421 A2 | 5/2009 |
| JP | 54-001742 A | 1/1979 |
| JP | 55-64409 A | 5/1980 |
| JP | 60-249609 A | 12/1985 |
| JP | 61-65026 A | 4/1986 |
| JP | 03-284197 A | 12/1991 |
| JP | 2003-032898 A | 1/2003 |
| JP | 2004-080945 A | 3/2004 |
| JP | 2004-514817 A | 5/2004 |
| JP | 2005-036685 A | 2/2005 |
| JP | 2006-191748 A | 7/2006 |
| RU | 2395696 C1 | 7/2010 |
| SU | 378644 | 4/1973 |
| SU | 454362 | 12/1974 |
| SU | 787695 A1 | 12/1980 |
| SU | 1163681 A1 | 12/1985 |

OTHER PUBLICATIONS

Extended European Search Report dated May 31, 2013, issued by the European Patent Office in corresponding European Patent Application No. 12181719.1 (7 pgs.).

Decision of Grant issued Jan. 13, 2015 by the Federal Service for Intellectual Property in corresponding Russian Patent Application No. 2012138139, and an English translation thereof.

Notification of Reasons for Refusal issued Feb. 2, 2015 by the Japanese Patent Office in corresponding Japanese Patent Application No. 2012-196782, and an English translation thereof.

\* cited by examiner

METHOD FOR OPERATING A POWER PLANT

RELATED APPLICATION

This application claims priority under 35 U.S.C. §119 to European Patent Application No. 11180459.7 filed in Europe on Sep. 7, 2011, the entire content of which is hereby incorporated by reference in its entirety.

FIELD

The present disclosure relates to a method for operating a power plant, for example, for operating combined power plants.

BACKGROUND INFORMATION

Power plants, such as combined power plants (for example, power plants including gas and steam turbines) can produce the base electric power that is supplied to an electric power grid.

With deregulation of the energy market, increased fuel prices and diffusion of renewable energies, combined power plants are more and more used to comply with peak power requests.

In order to comply with peak power requests, combined power plants can be asked to adapt their operation (in particular the power supplied to the grid) very fast, and should be able to operate with great flexibility. For example, when the energy required by the grid is low they should be able to reduce the power supplied to the grid up to zero and when the grid requires power again they should be able to provide it quickly. In some cases to provide tens of megawatt in seconds.

EP 2 056 421 discloses a method to connect a combined power plant with a gas turbine and a steam turbine to a grid. This method includes a first step where the gas turbine has full speed but does not supply any power to the grid. In addition the breaker is open. During this step the steam turbine loads up. In a second step the breaker is closed. During this step the steam turbine further loads up. In a third step the power plant energises the grid. Also during this step the steam turbine loads up. In a fourth step the power plant supplies power to the grid. During this step the steam turbine further loads up.

It is thus apparent that during the first through fourth steps the steam turbine does not supply any power to the grid. The steam turbine is in a transient, loading up operation. For this reason the method above could have some drawbacks.

When the steam turbine is in transient operation, it is not able to supply any power to the grid. The power plant cannot be able to satisfy a sudden power request from the grid. For example, in some cases sudden power requests from the grid can be as large as 50 MW/s or more.

SUMMARY

A method is disclosed for operating a power plant, including a gas turbine and a steam power generation system that drive at least one electric generator, the method comprising: supplying flue gases produced by the gas turbine into a boiler of the steam power generation system; generating, by the gas turbine in a steady operation, a first output power greater or less than zero; and generating, by the steam power generation system, a second output power greater than zero, wherein a total generated power is a sum of the first and second output powers, and is substantially equal to a house load of the power plant.

A method is disclosed for starting up a power plant including a gas turbine and a steam power generation system that drive at least one electric generator, wherein the gas turbine produces flue gases that are supplied into a boiler of the steam power generation system, the method comprising: starting up and loading up the gas turbine to generate a first output power greater than zero and substantially equal to a house load; starting up and loading up the steam power generation system to generate a second output power greater than zero; while the steam power generation system is loaded up, decreasing the first output power, a total generated power being a sum of the first and second output powers, and being substantially equal to a house load of the power plant; and then maintaining the power plant in a steady state operation with the total generated power being substantially equal to a house load of the power plant.

A method is disclosed for reducing the power of power plant including a gas turbine and a steam power generation system that drive at least one electric generator, wherein the gas turbine produces flue gases that are supplied into a boiler of the steam power generation system, wherein steam is generated that is then expanded in a turbine of the steam power generation system, the turbine having a stator and a rotor, the method comprising: decreasing a first output power of the gas turbine; then decreasing a second output power of the steam power generation system; further decreasing the first output power of the gas turbine such that a total generated power as a sum of the first and second output powers is substantially equal to a house load of the power plant; and then maintaining the power plant in a steady state operation with the total generated power substantially equal to a house load of the power plant.

BRIEF DESCRIPTION OF THE DRAWINGS

Further characteristics and advantages of the disclosure will be more apparent from the description of an exemplary embodiment of the disclosure, illustrated by way of non-limiting example in the accompanying drawings, in which.

DETAILED DESCRIPTION

Exemplary embodiments of the disclosure provide a method by which a combined power plant is able to comply with large, sudden power requests from the grid.

Figure 1:
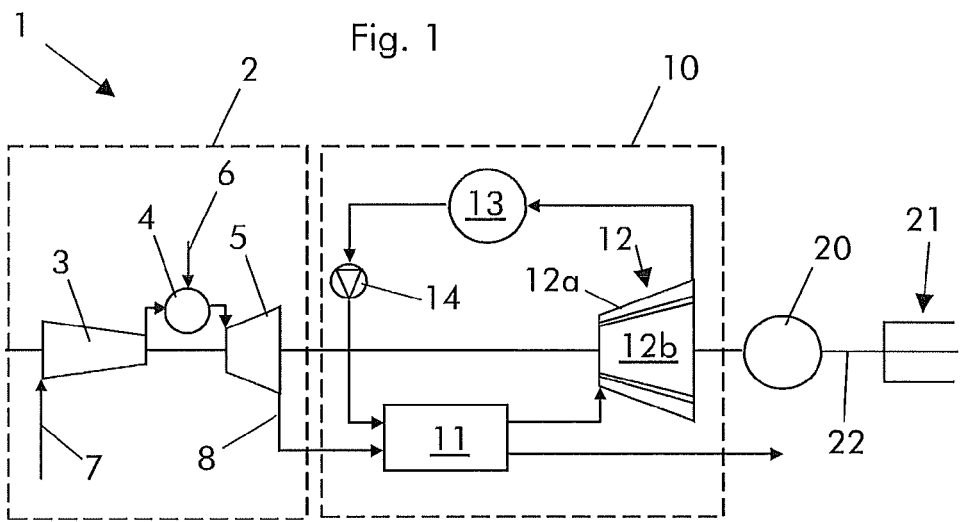
FIGS. 1 and 2 are schematic views of exemplary embodiments of combined power plants that can be used to implement methods according to the disclosure.

The method can be implemented in a power plant schematically described in FIG. 1.

The power plant 1 includes a gas turbine 2 having a compressor 3, a combustion chamber 4 and a turbine 5. The combustion chamber 4 is fed with fuel 6 and oxidiser 7 (for example, air compressed in the compressor 3). Fuel 6 and oxidiser 7 are combusted to generate hot gases that are expanded in the turbine 5 to gather mechanical power.

The turbine 5 discharges exhaust flue gases 8 are then supplied to a steam power generation system 10. The steam power generation system 10 has a boiler 11 (also called Heat Recovery Steam Generator HRSG) that receives the flue gases 8 from the gas turbine 2 and produces steam that is expanded in a steam turbine 12. A condenser 13 and a pump 14 are also provided.

The gas turbine 2 and steam power generation system 10 activate, or drive, an electric generator 20 connected to an electric grid 21 via line 22.

Figure 2:
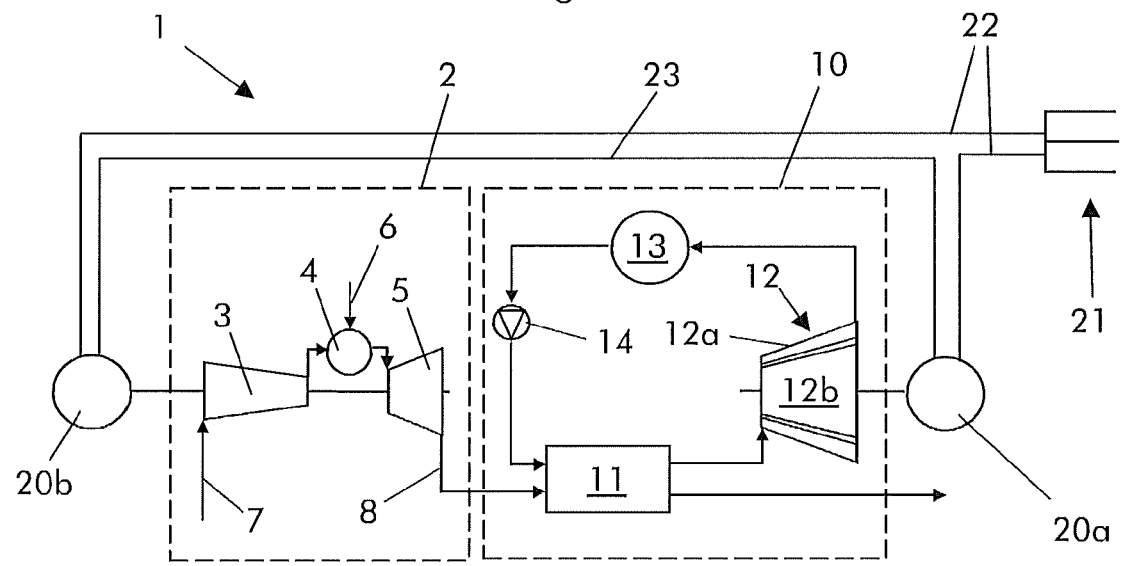

FIG. 2 shows an exemplary embodiment of a power plant according to the disclosure. In this figure the same numbers indicate same or similar components to those already described.

In the power plant of FIG. 2 each of the gas turbine 2 and steam power generation system 10 activate, or drive, one electric generator 20a, 20b. The generators 20a and 20b are in turn connected to the electric grid 21 via the lines 22 and are connected with each other via a line 23.

Other different power plant arrangements are possible.

An exemplary method for operating a power plant according to an exemplary embodiment disclosed herein is described with reference to FIGS. 1 and 3.

According to an exemplary method, in a steady (e.g., steady state) operation of the power plant 1, the gas turbine 2 generates a first output power 30 greater than zero, the steam power generation system 10 generates a second output power 31 greater than zero, and the total generated power 32 (the total generated power 32 being the sum of the first and second output power 30, 31) is substantially equal to a house load 33 of the power plant 1.

The house load 33 corresponds to that power that is to be provided to, or produced by, the power plant 1 to supply auxiliaries, and for internal use. Thus, when operating at the house load 33, the power plant produces power for its internal use but it is not able to substantially supply any power to the grid 21. In this respect, reference 32 indicates that the power supplied to the grid is zero.

During this operation at steady state the electric generator 20 is connected to the grid 21 (e.g., the breaker is closed). Therefore the generator 20 energises the grid 21 but does not provide any power to it. Alternatively, the electric generator 20 need not be connected to the grid 21 (e.g., the breaker is open).

Figure 3:
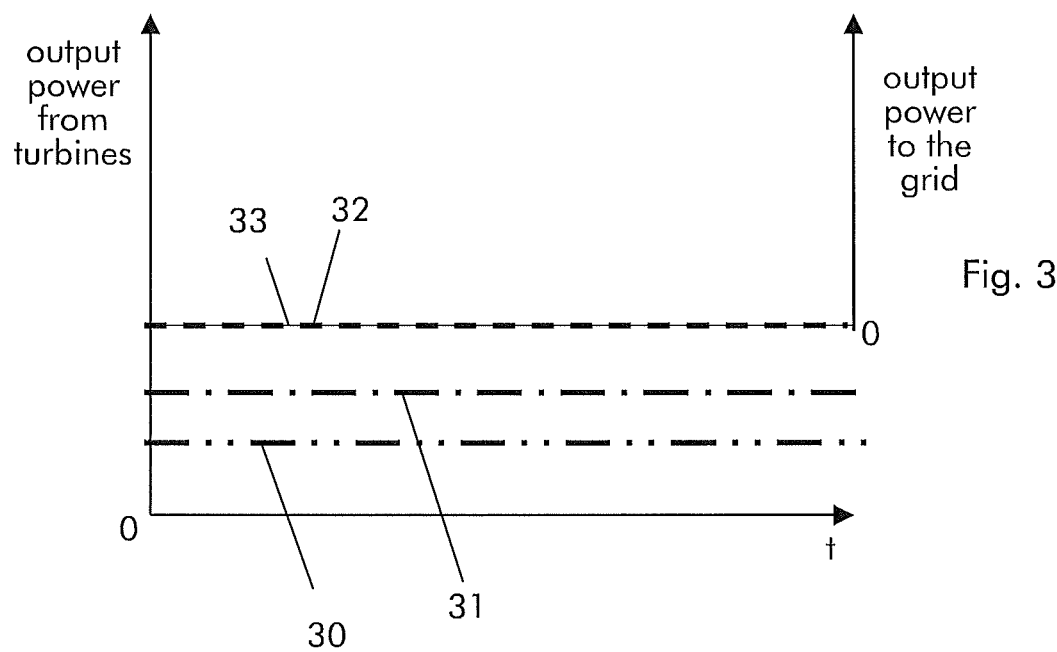
FIGS. 3 and 4 show two exemplary embodiments of the disclosure.

In the exemplary embodiment of the disclosure shown in FIG. 3, the output power 31 is almost twice as large as the output power 30. It is clear that this is only one of the numerous possibilities and in general the output power 30 and 31 can be equal or different.

Figure 4:
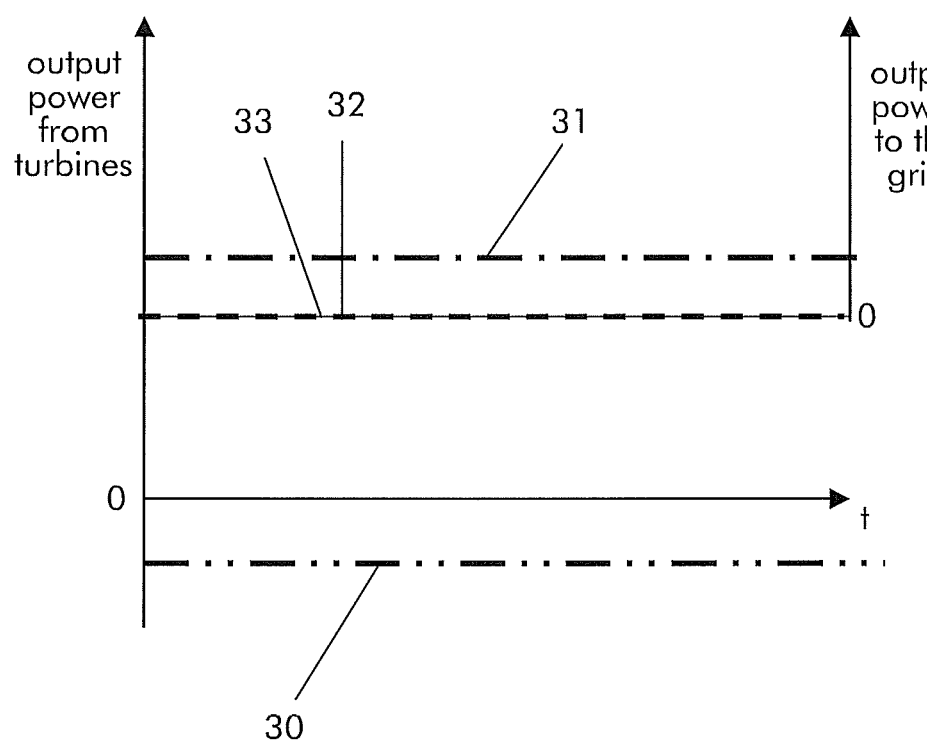

In the exemplary embodiment of the disclosure according to FIG. 4, the gas turbine 2 can produce a negative power, for example, can require power to operate (e.g., mainly to operate the compressor). In this case the power for the gas turbine operation can be provided by the steam power generation system 10.

In this respect FIG. 4 shows that the steam power generation system 10 generates an output power 31 larger than the house load 33 and the gas turbine 2 requires power (because the output power 30 is negative). Because the positive output power 31 compensates for the negative output power 30, the total generated power 32 (that is supplied to the grid 21) can be zero.

When operating under these conditions, the power plant 1 can be ready to provide large power to the grid 21 in a very short time periods, because both the gas turbine 2 and the steam power generation system 10 are already in working conditions (either connected to the grid 21 or not). In addition these conditions can be maintained for long periods, such that the power plant 1 can be continuously connected to the grid without providing any power to the grid, to only provide power to the grid when requested. The power plant 1 can thus operate to comply with peak power requests for example together with renewable power plants.

The steady (e.g., steady state) operation described above can be reached from a switched off condition (thus the power plant is started up) or from a normal operation during which the power plant supplies electric power to the grid 21 (thus the power plant is unloaded).

Figure 5:
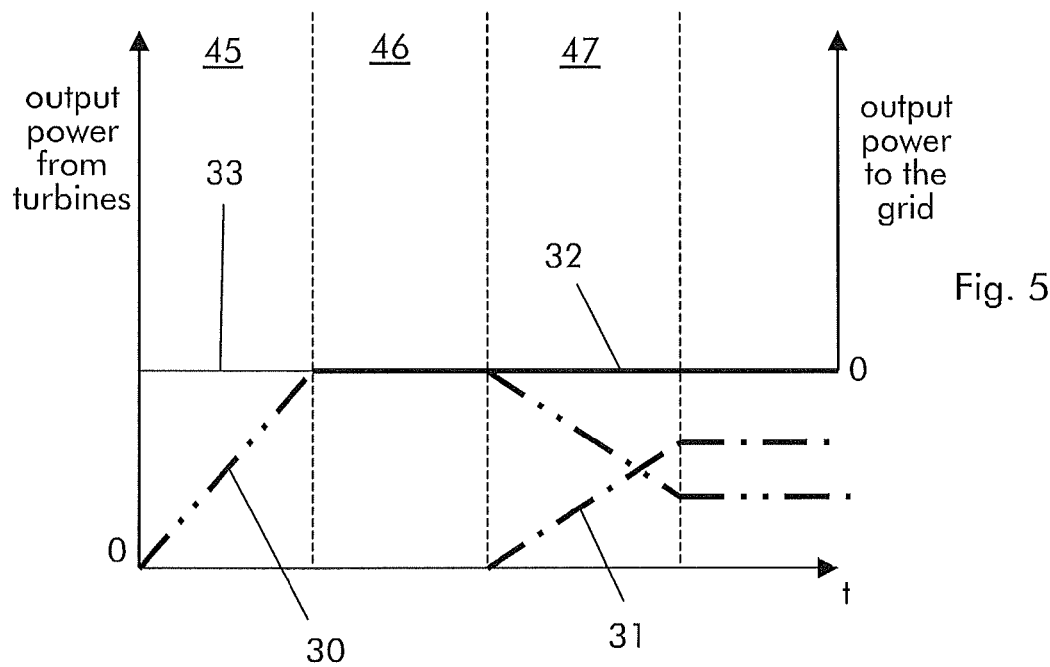
FIGS. 5 and 6 show exemplary embodiments according to the disclosure of a start-up of the power plant, to bring it to a condition in which it is connected to the grid (with either breaker open or not) but without supplying any power to the grid.

The start-up is described with reference to FIG. 5, that shows the output power 30 of the gas turbine 2, the output power 31 of the steam power generation system 10 and the total generated power 32 (equal to the sum of the output power 30 and 31).

In order to start up the power plant 1, the gas turbine 2 is started up and loaded up in a step 45 up to the house load 33 and is then maintained at the house load 33 (step 46).

In addition, during step 46, the steam power generation system 10 is started up (e.g., it is accelerated up to the synchronism speed) and is then loaded up in a step 47. In these conditions the steam power generation system 10 generates a second output power 31 greater than zero.

While the steam power generation system 10 is loaded up (i.e. during step 47) the output power 30 of the gas turbine 2 is decreased.

The total generated power 32 (being the sum of the first and second output power 30, 31) is substantially equal to the house load 33 of the power plant 1.

Figure 6:
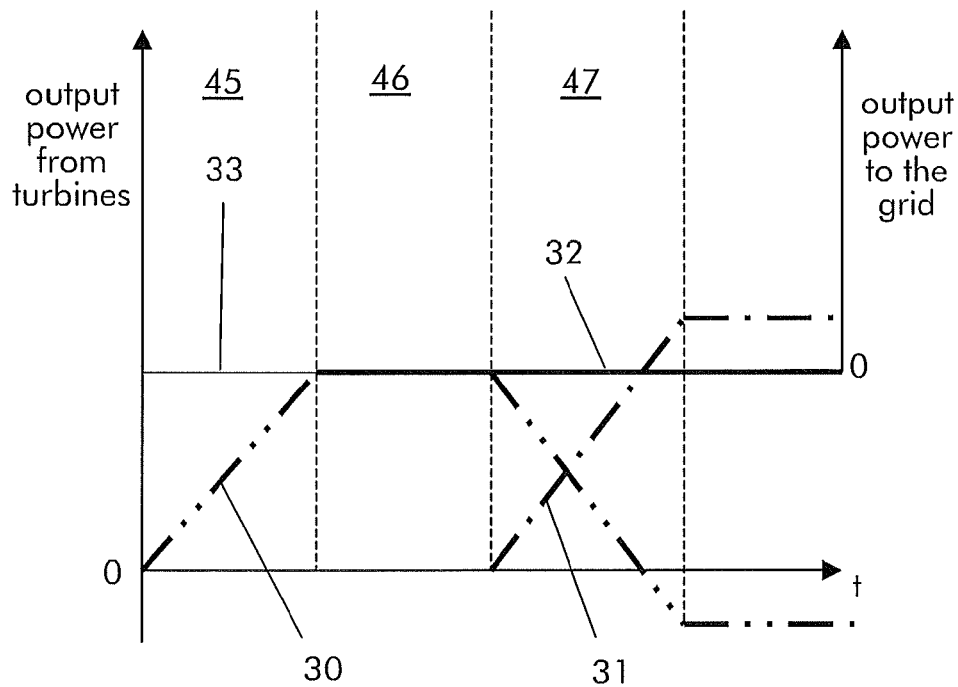

FIG. 6 shows an additional example in which during the step 47 the gas turbine output power 30 is reduced down to below zero, i.e. the gas turbine 2 requires power to operate. As already explained, in this case the power required by the gas turbine 2 can be provided by the steam power generation system 10 that can generate an output power 31 greater than the house load 33, such that the power 31 compensates for the power 30 and the total generated power 32 is substantially zero.

The plant 1 is then maintained in a steady (e.g., steady state) operation with the total generated power 32 substantially equal to the house load 33 (i.e. no power is supplied to the grid 21).

Advantageously, the electric generator 20 is connected to the grid 21. In this condition, because the power plant 1 only produces a power equal to the house load 33, the power plant 1 does not provide any power to the grid 21.

Within the boiler 11, steam is generated that is then expanded in the steam turbine 12. In addition the turbine 12 has a stator 12a and a rotor 12b. While the output power 30 of the gas turbine 2 is decreased during step 47, the gas turbine 2 is regulated to get a steam minimum temperature compatible with the rotor 12b. In other words, because the steam exchanges heat with the rotor 12b the steam temperature cannot be too different from the temperature of the same rotor 12b, because it can cause high stress. For this reason the temperature of the steam should be close to the temperature of the rotor 12b.

The reduction of output power to bring a power plant 1 from a condition in which it supplies power to the grid 21 to a condition in which it is connected to the grid 21 but does not supply any power to it is described with reference to FIG. 7.

Figure 7:
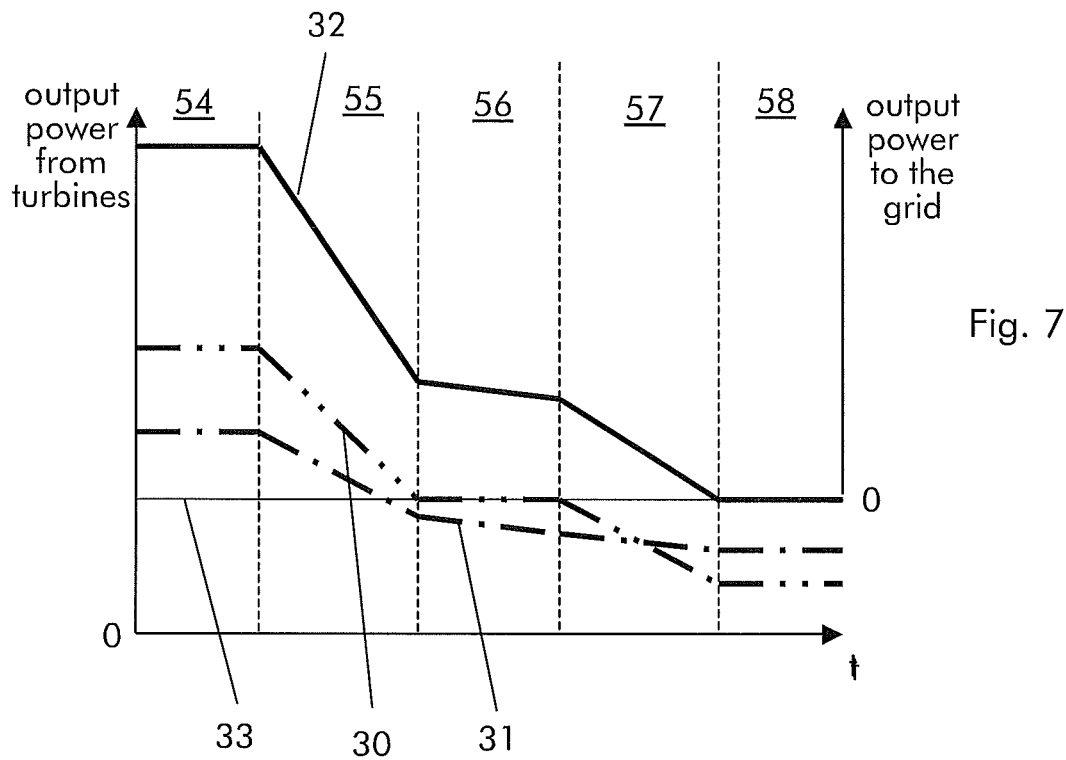
FIGS. 7 and 8 show exemplary embodiments according to the disclosure of an unloading of the power plant, to bring it to a condition in which it is connected to the grid (with either a breaker open or not) but without supplying any power to the grid.

FIG. 7 shows the first output power 30 of the gas turbine 2, the second output power 31 of the steam power generation system 10, the total generated power 32 (corresponding to the power supplied to the grid 21) and the house load 33.

Starting from a steady (e.g., steady state) operation 54 with the power plant 1 that supplies power to the grid 21, the method includes a step 55 of decreasing the first output power 30 of the gas turbine 2. In an exemplary embodiment of the disclosure, the first output power is decreased up to achieve a minimum steam temperature compatible with the rotor 12b.

During this phase, the second output power 31 of steam power generation system 10 is also reduced due to the less heat provided by the gas turbine exhaust gases to the boiler 11 that causes less steam generation in the boiler 11.

Then, in a step 56, the second output power 31 of the steam power generation system 10 is decreased to a stable operation (while the first output power 30 of the gas turbine 2 is maintained substantially constant) and in a subsequent step 57 the first output power 30 of the gas turbine 2 is further decreased, such that the total generated power 32 (i.e., the sum of the first and second output power 30, 31) produced by the gas turbine 2 and steam power generation system 10 is substantially equal to the house load 33 of the power plant 1.

FIG. 7 shows an example in which both the gas turbine 2 and the steam power generation system 10 generate a positive first power output 30 and second power output 31.

Figure 8:
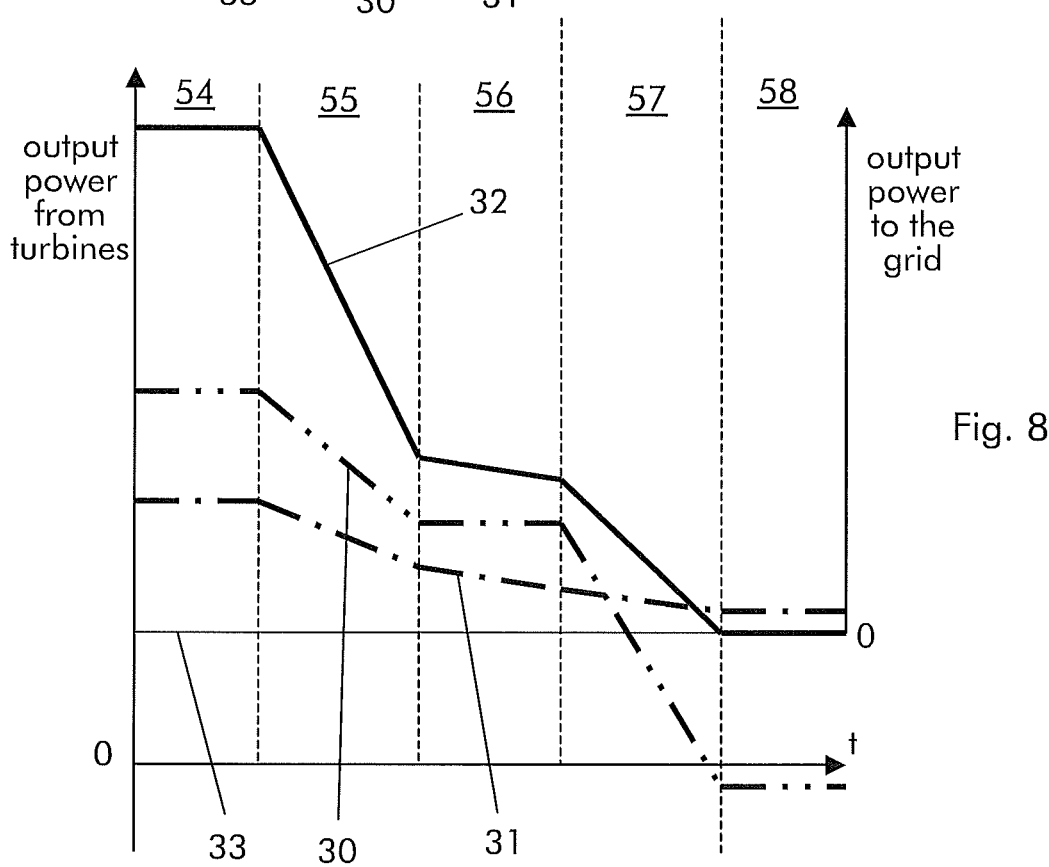

FIG. 8 shows an example in which the output power 30 of the gas turbine 2 is reduced up to below zero. In this case the gas turbine 2 requires power to operate, this power being supplied by the steam power generation system 10.

Thus the power plant can be maintained in a steady (e.g., steady state) operation (step 58), with the total generated power 32 substantially equal to a house load 33 of the power plant 1.

The power plant 1 of FIG. 1 has the turbine 5, steam turbine 12 and generator 20 connected through one single shaft. It is apparent that the same method can also be implemented with a power plant 1 having more than one shaft, such as for example the power plant of FIG. 2.

In this case the gas turbine 2 (or each gas turbine 2 if more than one gas turbine is provided) and the steam power generation system 10 (or each steam power generation system 10 if more of them are provided) are connected to generators 20a, 20b that are connected to the grid 21. The power transfer from the steam power generation system 10 to the gas turbine 2 (when this is desired) can occur via the grid 21. For example, the steam power generation system 10 can provide power to the grid 21 and the gas turbine 2 can adsorb power from the grid 21 (its generator 20b works as a motor) such that the total generated power (that is supplied to the grid 21 and being the difference between the power supplied by the steam power generation system 10 and the power adsorbed by the gas turbine 2) is zero.

In addition or alternatively the power can be transferred directly between the generators 20a, 20b via the line 23.

Additionally, it is also possible to disconnect the power plant 1 from the grid 21.

The features described can be independently provided from one another or in any desired combination.

In practice materials and dimensions can be chosen at will according to specifications and/or requirements.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

Reference Numbers
1 power plant
2 gas turbine
3 compressor
4 combustion chamber
5 turbine
6 fuel
7 oxidiser
8 flue gases
10 steam power generation system
11 boiler
12 turbine
12a stator
12b rotor
13 condenser
14 pump
20,20a,20b electric generator
21 grid
22 line
23 line
30 (30a) first output power from 2
31 (31a) second output power from 12
32 total generated power (30+31)
33 house load
45,46,47 steps
54,55,56,57 steps
t time

What is claimed is:

1. A method for operating a power plant, including a gas turbine having a compressor and a steam power generation system that drive at least one electric generator, the method comprising:
   supplying flue gases produced by the gas turbine into a boiler of the steam power generation system;
   generating, by the gas turbine in a steady operation, net output power less than zero; and
   generating, by the steam power generation system, a net output power greater than zero, wherein a total generated power of the power plant is a sum of the net output power of the gas turbine and the net output power of the steam power generation system and is substantially equal to a house load of the power plant.

2. The method according to claim 1, comprising:
   generating the second output power larger than the house load with the steam power generation system; and
   using the power generated by the steam power generation system in excess of the house load to drive the gas turbine.

3. The method according to claim 1, wherein the electric generator is connected to a grid.

4. The method according to claim 1, wherein the gas turbine operates at grid frequency.

5. The method according to claim 1, wherein the gas turbine, steam powered generation system and at least one electric generator are all arranged on a single shaft.

6. The method according to claim 1, wherein the power plant includes a gas turbine electric generator and a steam power generation system electric generator and the gas turbine electric generator and the steam power generation system electric generator are connected to each other via a line, the method comprising transferring power directly between the gas turbine electric generator and a steam power generating system electric generator directly via the line.

7. A method for starting up a power plant including a gas turbine having a compressor and a steam power generation system that drive at least one electric generator, wherein the gas turbine produces flue gases that are supplied into a boiler of the steam power generation system, the method comprising:

starting up and loading up the gas turbine to generate a net output power greater than zero and substantially equal to a house load;

starting up and loading up the steam power generation system to generate a net output power greater than zero;

while the steam power generation system is loaded up, decreasing the first output power below zero, a total generated power of the power plant being a sum of the net output power of the gas turbine and the net output power of the steam power generation system, and being substantially equal to a house load of the power plant; and then maintaining the power plant in a steady state operation with the total generated power being substantially equal to a house load of the power plant.

8. The method according to claim 7, comprising:
connecting the electric generator to a grid.

9. The method according to claim 7, wherein the gas turbine has a stator and a rotor, the method comprising:

generating steam within the boiler and expanding the steam in one or more turbines of the steam power generation system; and regulating the gas turbine while decreasing the first output power, to get a steam minimum temperature compatible with the rotor.

10. The method according to claim 7, wherein the gas turbine operates at grid frequency.

11. The method according to claim 7, wherein the gas turbine, steam powered generation system and at least one electric generator are all arranged on a single shaft.

12. The method according to claim 7, wherein the power plant includes a gas turbine electric generator and a steam power generation system electric generator and the gas turbine electric generator and the steam power generation system electric generator are connected to each other via a line, the method comprising transferring power directly between the gas turbine electric generator and a steam power generating system electric generator directly via the line.

13. A method for reducing the power of power plant including a gas turbine having a compressor and a steam power generation system that drive at least one electric generator, wherein the gas turbine produces flue gases that are supplied into a boiler of the steam power generation system, wherein steam is generated that is then expanded in a turbine of the steam power generation system, the turbine having a stator and a rotor, the method comprising:

decreasing a net output power of the gas turbine; then decreasing a net output power of the steam power generation system;

further decreasing the net output power of the gas turbine below zero such that a total generated power of the power plant as a sum of the net output power of the gas turbine and the net output power of the steam power generation system is substantially equal to a house load of the power plant; and then maintaining the power plant in a steady state operation with the total generated power substantially equal to a house load of the power plant.

14. The method according to claim 13, wherein an initial decreasing of the net output power of the gas turbine comprises:

decreasing the net output power to achieve a minimum steam temperature compatible with the rotor.

15. The method according to claim 13, comprising:
disconnecting the power plant from the grid.

16. The method according to claim 13, wherein the gas turbine operates at grid frequency.

17. The method according to claim 13, wherein the gas turbine, steam powered generation system and at least one electric generator are all arranged on a single shaft.

18. The method according to claim 13, wherein the power plant includes a gas turbine electric generator and a steam power generation system electric generator and the gas turbine electric generator and the steam power generation system electric generator are connected to each other via a line, the method comprising transferring power directly between the gas turbine electric generator and a steam power generating system electric generator directly via the line.

\* \* \* \* \*